United States Patent [19]

Badger et al.

[11] 4,102,024
[45] Jul. 25, 1978

[54] METHOD AND APPARATUS FOR MAKING FLATTENED EXPANDED LEAD STRIP FOR BATTERY PLATES

[75] Inventors: John P. Badger, Genoa; Jack R. Rinker, Toledo, both of Ohio

[73] Assignee: Eltra Corporation, Toledo, Ohio

[21] Appl. No.: 754,131

[22] Filed: Dec. 23, 1976

[51] Int. Cl.² .......................................... B21D 31/04
[52] U.S. Cl. .................................................... 29/6.2
[58] Field of Search ............... 29/2, 6.1, 6.2; 83/695, 83/678; 429/242; 100/176

[56] References Cited

U.S. PATENT DOCUMENTS

| | | | |
|---|---|---|---|
| 875,153 | 12/1907 | Clark | 29/6.2 |
| 947,794 | 2/1910 | Clark | 29/6.1 |
| 1,145,342 | 7/1915 | White | 29/6.2 |
| 1,210,848 | 1/1917 | Scammell | 29/6.1 |
| 1,510,696 | 10/1924 | Naugle et al. | 29/6.1 |
| 1,747,138 | 2/1930 | Kessler | 29/6.1 |
| 1,827,314 | 10/1931 | Gersman | 29/6.1 |
| 2,026,972 | 1/1936 | Greene | 29/6.2 X |
| 2,114,592 | 4/1938 | Cross | 29/6.1 |
| 3,218,689 | 11/1965 | Mumma | 29/6.2 |
| 3,945,097 | 3/1976 | Daniels, Jr. et al. | 429/242 X |

Primary Examiner—Othell M. Simpson
Assistant Examiner—Horace M. Culver
Attorney, Agent, or Firm—Robert H. Johnson

[57] ABSTRACT

Apparatus for and a method of making expanded lead strip for use in fabricating plates for lead-acid secondary batteries. Lead strip is expanded into a non-planar shape with two mesh portions divided by a longitudinally extending unexpanded portion. The expanded strip is then flattened and smoothed from the non-planar shape and reduced in thickness.

19 Claims, 14 Drawing Figures

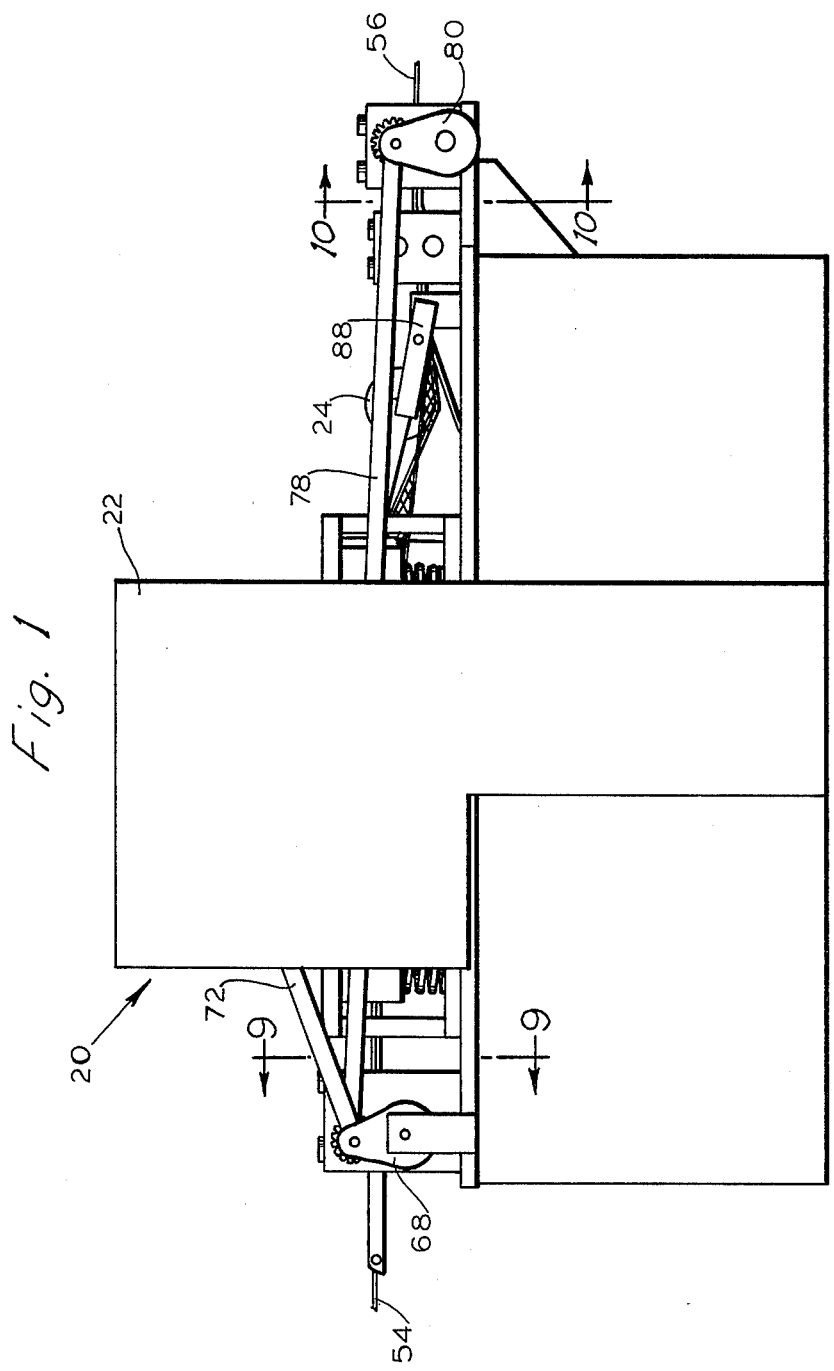

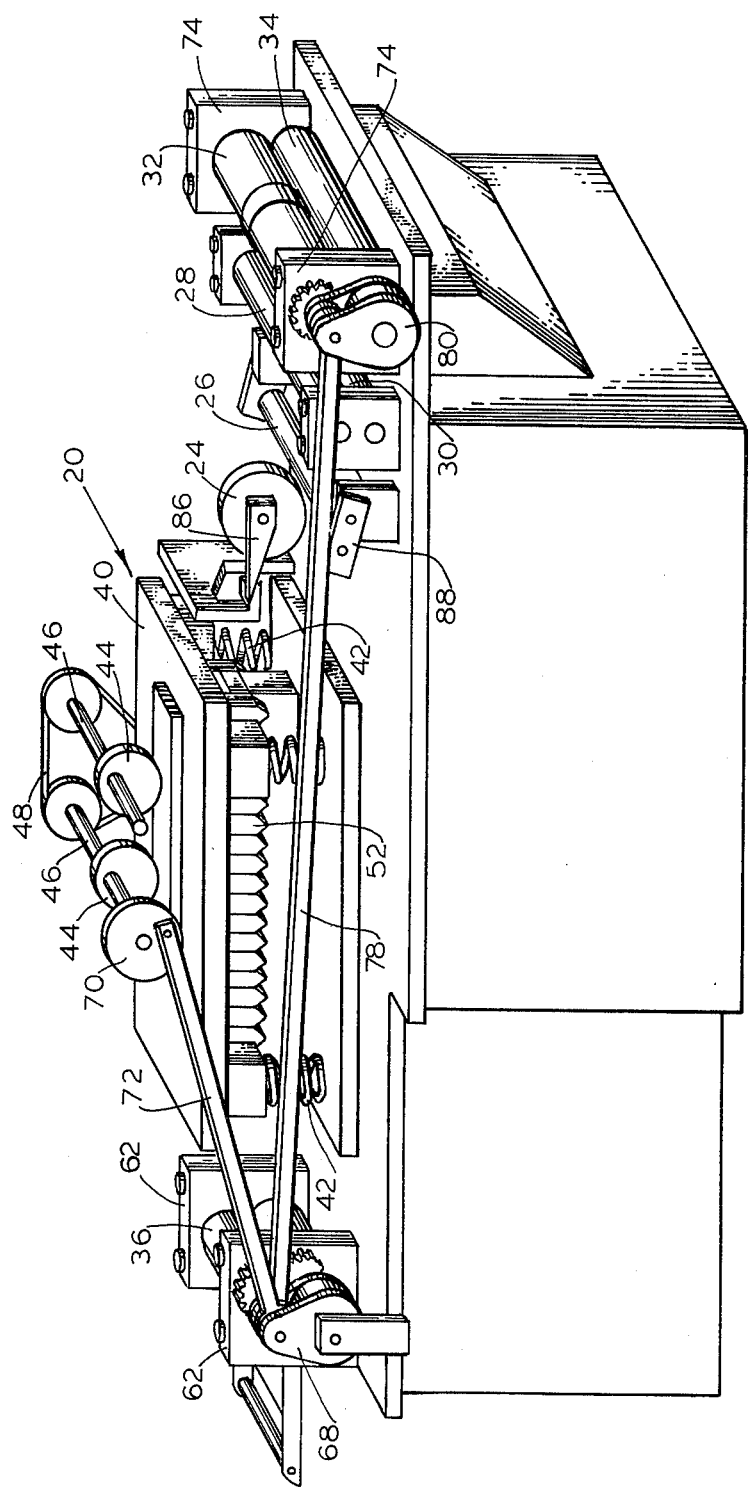

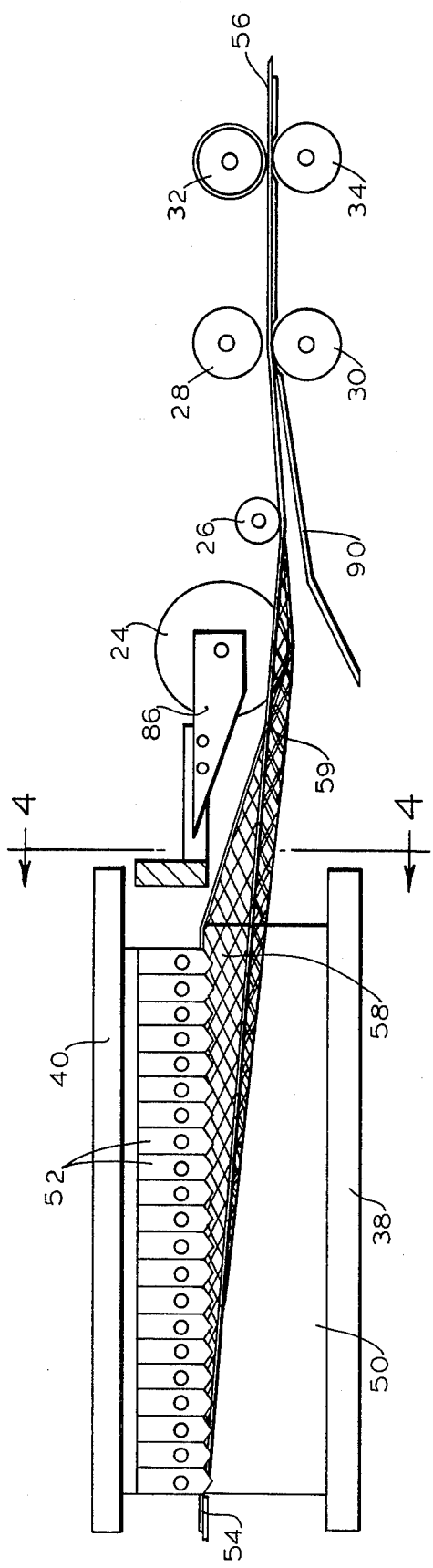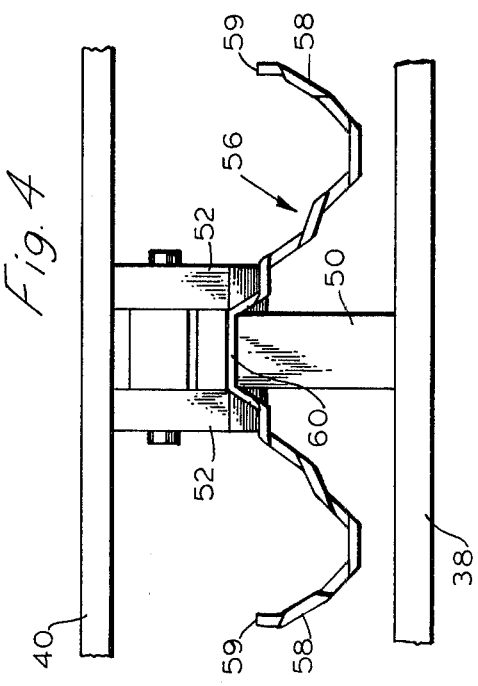

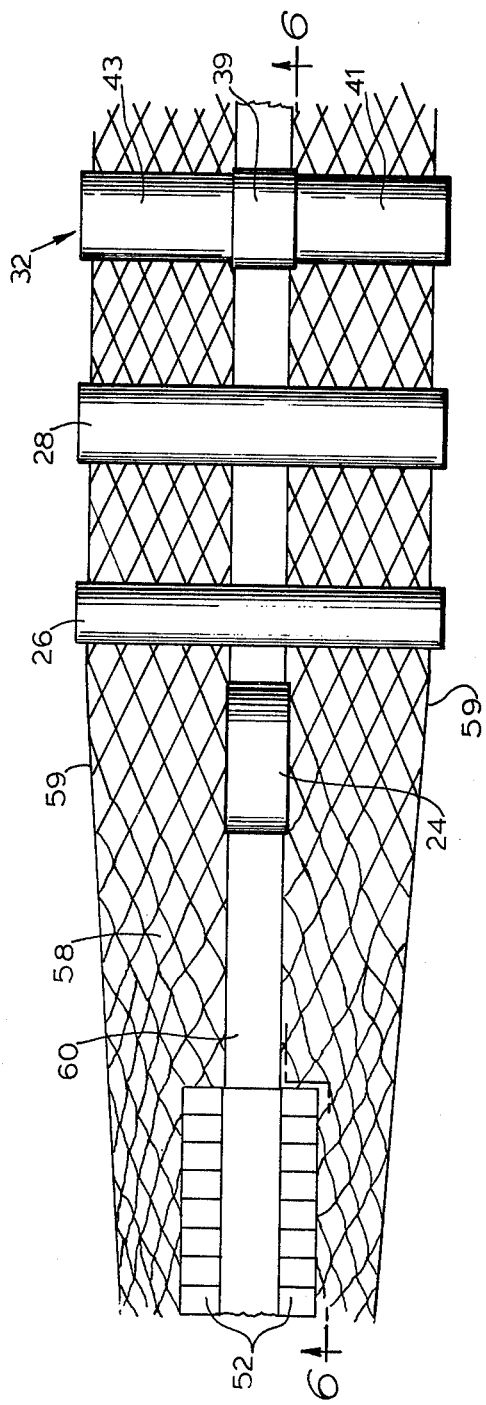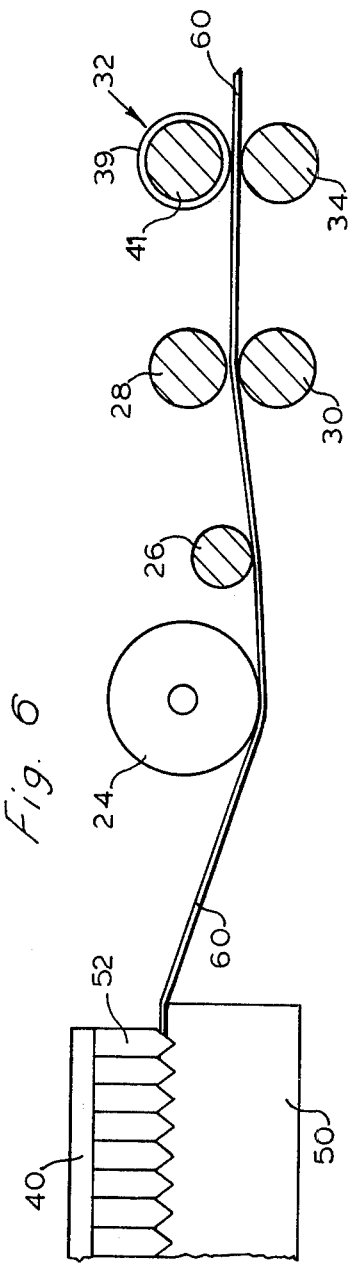

METHOD AND APPARATUS FOR MAKING FLATTENED EXPANDED LEAD STRIP FOR BATTERY PLATES

BACKGROUND OF THE INVENTION

The field of art to which this invention relates includes the manufacture of electric storage batteries, and more specifically the making of expanded lead strip for use in the fabrication of positive and negative plates for secondary batteries.

The use of a continuous expanded lead strip in the fabrication of plates for lead-acid batteries is gaining in popularity and is replacing the use of separate cast lead grids. A complete system for fabricating battery plates and which utilizes a continuous expanded lead strip is disclosed in U.S. Pat. Nos. 3,853,626; 3,867,200 and 3,890,160.

One of the problems that is encountered when using expanded lead strip is obtaining expanded lead strip which is substantially flat. A further problem is that in the course of flattening the expanded lead strip there is a tendency for the individual cells of the mesh portions thereof to become distorted and non-uniform.

Therefore, it is a principal object of our invention to make expanded lead strip which has uniform and undistorted cells forming the mesh portions and which is substantially flat.

It often is desirable to reduce the thickness of the mesh portions of the expanded strip, but such reduction tends to cause the expanded strip to become wavy which is undesirable.

Thus, a further object of our invention is to reduce the thickness of the mesh portions without inducing ay waviness into the expanded strip.

While lead strip will be referred to throughout, it should be understood that lead alloys, such as lead-antimony and lead-calcium-tin, are included as well as any other metallic strips which are suitable for expanding.

SUMMARY OF THE INVENTION

In carrying out our invention in a preferred embodiment, there is provided a method comprising the steps of: moving a lead strip through an expanding machine; operating the machine in synchronism with movement of the strip so that the strip is expanded into a non-planar shape with a pair of mesh portions divided by a central longitudinally extending unexpanded portion; flattening and smoothing the expanded strip from its non-planar shape and reducing the thickness of the flattened expanded strip.

Apparatus for carrying out our method includes an expanding machine which produces expanded strip in a non-planar shape, a pair of powered rollers which pull the lead strip through the expanding machine and reduce the thickness of the expanded strip, a diverting wheel which forces the central portion of the expanded strip to substantially the same level or slightly below the level of the transversely adjacent outer edges of the expanded strip, a single roller located so that the expanded strip passes partially around it after passing the diverting wheel, and a pair of non-powered rollers between which the expanded strip passes just before passing between the pair of powered rollers.

The above and other objects, features and advantages of our invention will be more easily understood by persons skilled in the art when the detailed description is taken in conjunction with the drawing.

BRIEF DESCRIPTION OF THE DRAWING

FIG. 1 is a side elevation of an expanding machine and roller assembly for producing flattened expanded lead strip, FIG. 2 is a perspective view of the apparatus shown in FIG. 1 with some of the covers removed to show better the details of the apparatus, FIG. 3 is a schematic view showing the relationship of the dies, cutter, diverting wheel and rollers, FIG. 4 is a cross-section taken along line 4—4 of FIG. 3 to show better the configuration of the expanded lead strip as it leaves the expanding machine, FIG. 5 is a plan view of the expanded lead strip showing the arrangement of the diverting wheel and rollers, FIG. 6 is a longitudinal sectional view showing the path of the strip past the diverting wheel and rollers.

DESCRIPTION OF THE PREFERRED EMBODIMENT

Figure 7:
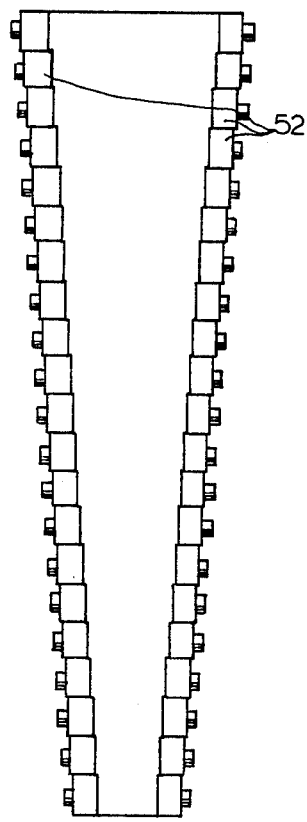
FIG. 7 shows the arrangement of the dies in a converging double row.

Referring to FIGS. 1 and 2 of the drawing, reference numeral 20 denotes generally apparatus for producing flattened expanded lead strip which can be used in the manufacture of plates for batteries. Apparatus 20 includes an expanding machine 22 of a commercially available type, a diverting wheel and a plurality of rollers. These rollers and wheel, as best seen in FIGS. 3, 5 and 6, include a diverting wheel 24, a single roller 26, a first pair of non-powered rollers 28 and 30, a second pair of powered rollers 32 and 34 and a pair of initial feed rollers 36 and 37. Roller 32 is a compound roller and includes a central segment 39 and two reduced diameter segments 41 and 43.

Expanding machine 22 includes a stationary base 38 and a top 40 which is arranged for vertical reciprocating movement. Top 40 is mounted on a plurality of helical springs 42 located adjacent each corner thereof and is forced downwardly against the bias of the springs 42 by a pair of eccentric cams 44 mounted on parallel shafts 46 which are driven by a motor, not shown, through a belt drive 48.

Figure 8:
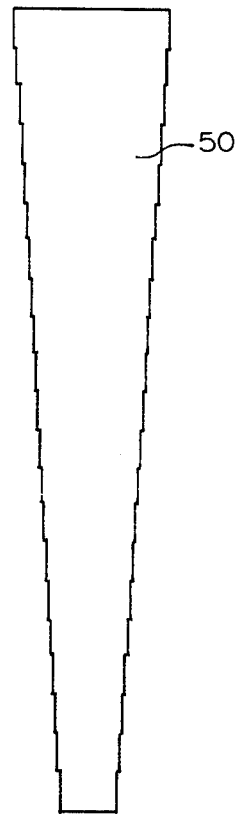
FIG. 8 shows the configuration of the cutter to cooperate with the die arrangement shown in FIG. 7.

Mounted in expanding machine 22 is a cutter 50 (FIG. 8) connected to base 38 and a plurality of converging dies 52 (FIG. 7) connected to top 40 to form a progressive die and cutter set. Dies 52 cooperate with cutter 50 so that as top 40 is moved up and down and a solid lead strip 54 is feed incrementally between dies 52 and cutter 50 from left to right, as viewed in FIG. 1, expanded lead strip 56 is formed (FIG. 11) which includes a pair of expanded mesh portions 58 divided by a longitudinally extending centrally disposed unexpanded portion 60. Each mesh portion is made up of a plurality of diamond-shaped cells 61 (FIGS. 13 and 14 formed by a plurality of strands 65 interconnected at nodes 69 which are compressed when the thickness of the mesh portion is reduced as explained later in more detail. It will be understood, however, that as the expanded lead strip emerges from expanding machine 22 that it has a non-planar shape and still needs to be flattened and smoothed.

Figure 9:
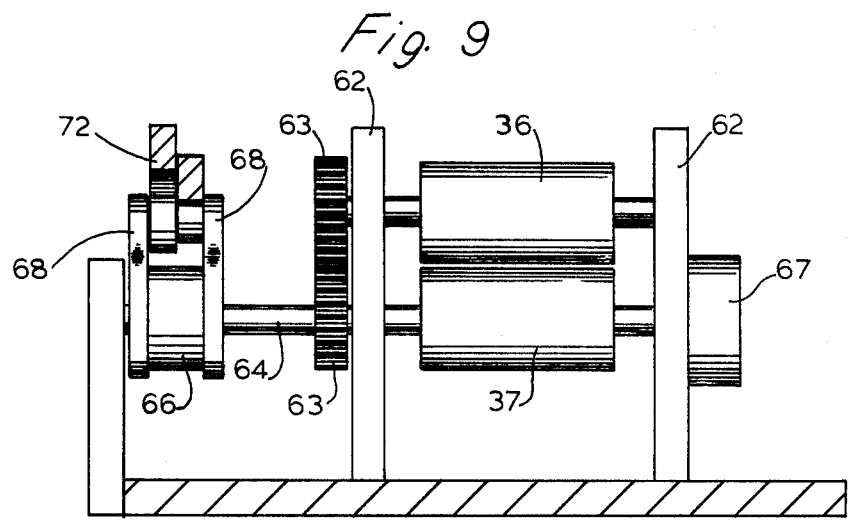
FIG. 9 is a view taken along line 9—9 in FIG. 1.

Located to the front of expanding machine 22 is the pair of rollers 36 and 37 (FIG. 9) journaled in a pair of trunion blocks 62. These rollers serve to feed lead strip 54 into expanding machine 22 until expanded strip 56 is gripped by rollers 32 and 34 which then pull strip 54 through expanding machine 22. Rollers 36 and 37 are interconnected by a pair of meshing gears 63 and roller 37 is connected by a shaft 64 to a conventional one-way clutch 66 from which a pair of arms 68 extend. Arms 68 are connected to a wheel 70 (FIG. 2) mounted on one of shafts 46 by means of a link 72 which is pivotally connected to arms 68 and wheel 70. Thus, as shafts 46 rotate, top 40 reciprocates vertically and arm 68 oscillates about shaft 64. Assuming clockwise rotation of shafts 46, as viewed in FIG. 2, clutch 66 is arranged so that clockwise oscillation of arms 68 causes the clutch to engage and rotate rollers 36 and 37 so that lead strip passing between the rollers will be fed into expanding machine 22. Attached to the end of shaft 64 opposite clutch 66 is a conventional brake 67 which prevents free rotation of rollers 36 and 37 at any time.

Figure 10:
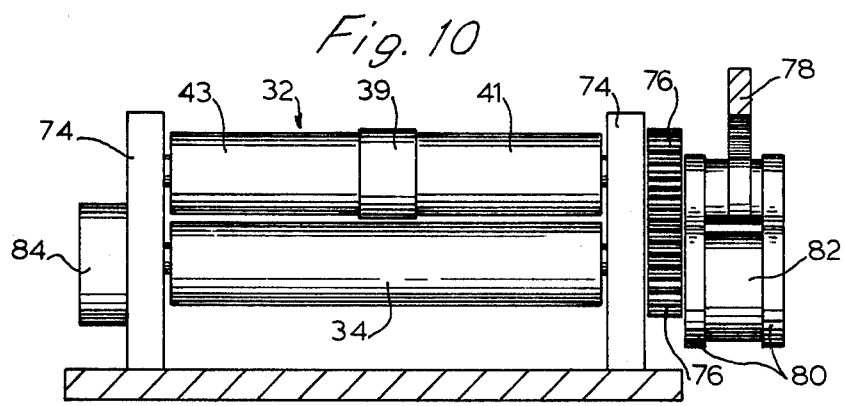
FIG. 10 is a view taken aong line 10—10 in FIG. 1.

Located to the rear of expanding machine 22 are powered rollers 32 and 34 (FIG. 10) which are journaled in a pair of trunnion blocks 74. Rollers 32 and 34 are interconnected by means of a pair of meshing gears 76. Roller 34 is driven by means of a link 78 which is pivotally connected at one end to arms 68 and at the other end thereof to a pair of arms 80 which extend from a one-way clutch 82 that is connected to roller 34 so that only clockwise oscillation of arms 80, as viewed in FIG. 2, causes rotation of rollers 32 and 34. Rollers 32 and 34 are held from free rotation at any time by means of a brake 84 which is connected to roller 34 opposite from clutch 82. Rollers 32 and 34 serve to pull expanded lead mesh through expanding machine 22 and reduce the thickness of the expanded lead strip passing between them as will be explained in greater detail hereinafter.

Mounted for rotation on a stationary bracket 86 and immediately to the rear of expanding machine 22 and generally in line with the longitucinal axis thereof is wheel 24 which functions to divert the central portion 60 of expanded strip 56 to substantially the same level or slightly below the level of the edges 59 of expanded strip 56 transversely adjacent thereto.

Immediately behind wheel 24 roller 26 is mounted for rotation on a pair of arms 88 which are pivotal to provide for vertical adjustment of roller 26.

Located between roller 26 and rollers 32 and 34 is the pair of non-powered rollers 28 and 30 which, together with roller 26, help to smooth the flattened expanded lead strip. A ramp 90 leads up to roller 30 and another ramp 92 spans the space between roller 30 and 34. These ramps facilitate threading the lead strip between the various rollers when initiating operation of apparatus 20.

Lead strip is threaded through apparatus 20, best shown in FIGS. 3, 5 and 6, so that it passes between powered rollers 32 and 34 which grip the lead strip and thus pull the strip through the apparatus.

Rotation of the set of rollers 36 and 37 and the set of rollers 32 and 34 is synchronized with the opening and closing of dies 52 with cutter 50 through the above described linkage 70, 72, 78 so that a solid lead strip 54 which is fed into expanding machine 22 emerges at the rear as an expanded lead strip 56 having a pair of mesh portions 58 with generally diamond-shaped cells 61, the mesh portions being divided by a longitudinally extending unexpanded portion 60.

As the expanded lead strip 56 emerges from expanding machine 22 it has generally the non-planar configuration shown in FIG. 4 with the central portion 60 raised and the mesh portions 58 curving downwardly and then up at the outer edges 59 thereof. The outer edges 59 tend to be upturned since they are maintained taut due to rollers 32 and 34 pulling the lead strip through apparatus 20 and the fact that the lead strip narrows from the fully expanded width to the width of the solid strip where it initially enters expanding machine 22.

The non-planar shape of the expanded strip as it emerges from expanding machine 22 is not suitable for use in the fabrication of battery plates, so the expanded strip 56 is flattened by moving it past a diverter which in this case is wheel 24 and passing it between a pair of powered rollers 32 and 34 which grip the expanded lead strip and pull it past wheel 24. This causes the centrally located unexpanded portion 60 to be pushed down to a point which is near or slightly below the level of the outer edges 59 of the expanded strip at a point substantially transverse therefrom. Running the expanded strip 56 past wheel 24 is particularly effective in that as the central portion 60 of the strip is pushed down for flattening this action at the same time avoids collapsing or distorting the portion of the mesh adjacent central portion 60.

Figure 13:
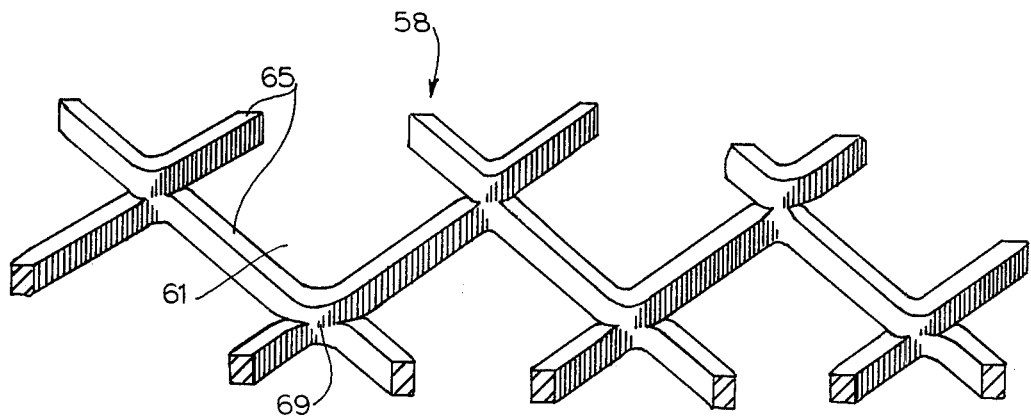
FIG. 13 is an enlarged fragmentary view of the mesh portion of the expanded lead strip before it is reduced in thickness.
Figure 14:
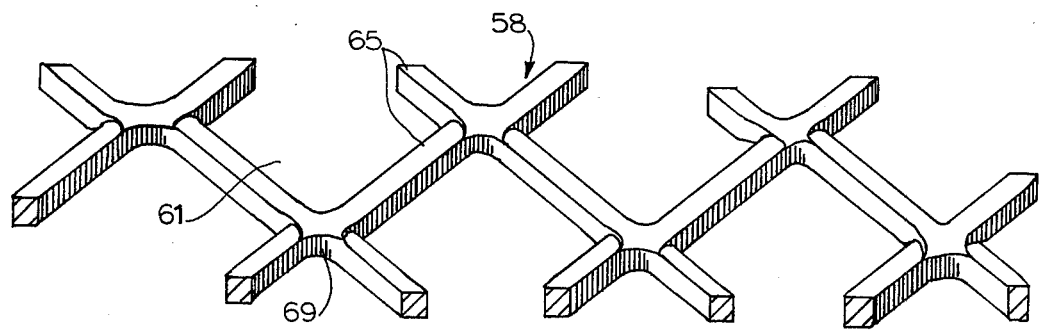
FIG. 14 is similar to FIG. 13, but after the mesh portion is reduced in thickness.

Roller 32, has a central segment 39 and reduced diameter segments 41 and 43 which accommodate expanded strip 56 since the mesh portions 58 are thicker than central unexpanded portion 60. Depending upon the spacing between rollers 32 and 34, expanded strip 56 may only be gripped and pulled through to complete the flattening process and provide mesh portions with cells 61 as shown in FIG. 13, or, if the spacing between rollers 32 and 34 is close enough, expanded strip 56 additionally will be reduced in thickness, particularly the mesh portions 58 thereof so that the cells 61 and nodes 69 are as shown in FIG. 14.

Figure 12:
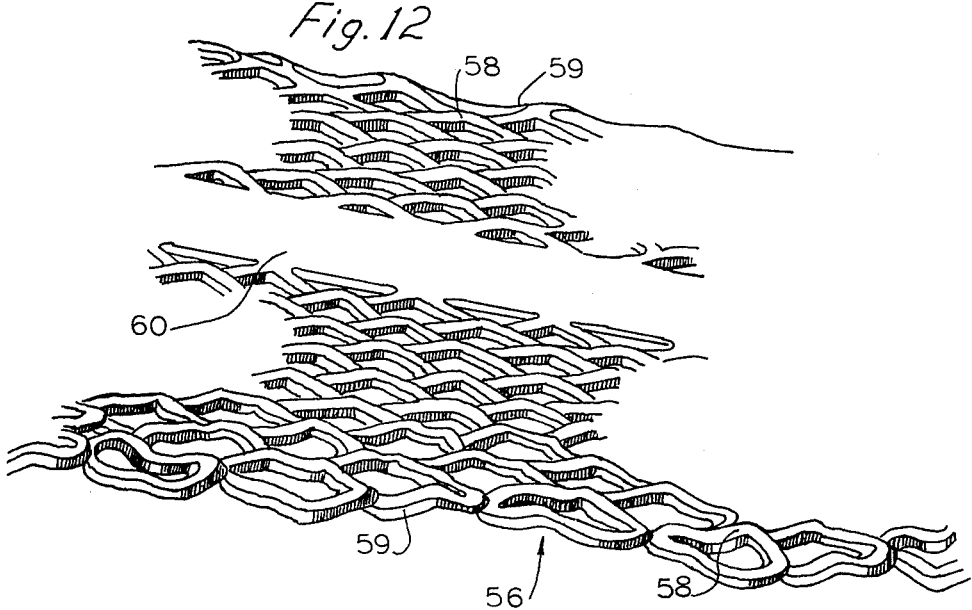
FIG. 12 shows a portion of expanded lead strip which has been reduced in thickness and is wavy.

If only the mesh portion 58 of expanded strip 56 are reduced in thickness the entire expanded strip becomes wavy, as shown in FIG. 12. This is due to the fact that reducing the thickness of mesh portions 58 causes them to lengthen (They cannot expand sideways significantly because they are held between rollers 32 and 34.) while the length of central portion 60 remains unchanged. In order to avoid having strip 56 become wavy as mesh portions 58 are reduced in thickness the central segment 39 of roller 32 is sized relative to segments 41 and 43 so that for a given reduction in thickness of mesh portions 58 and corresponding lengthening thereof there is a reduction in thickness of central portion 60 of strip 56 which causes a lengthening thereof which is substantially equal to the lengthening of mesh portions 58.

There is some tendency for expanded strip 56 to wrinkle occasionally during flattening when only diverter wheel 24 and powered rollers 32 and 34 are utilized. In order to avoid such wrinkling, roller 26 is placed immediately behind wheel 24 and located so that expanded strip 56 must roll partially around roller 26 as expanded strip 56 moves past it. Further, a pair of rollers 28 and 30 are located between roller 26 and rollers 32 and 34 and also serve to smooth the flattened expanded strip 56. Roller 30 is disposed so that the expanded strip must roll around it partially as it moves past roller 30. Roller 28 is located so that it just contacts the top of the expanded strip, but not sufficiently close enough so that the expanded strip is gripped between rollers 28 and 30.

Figure 11:
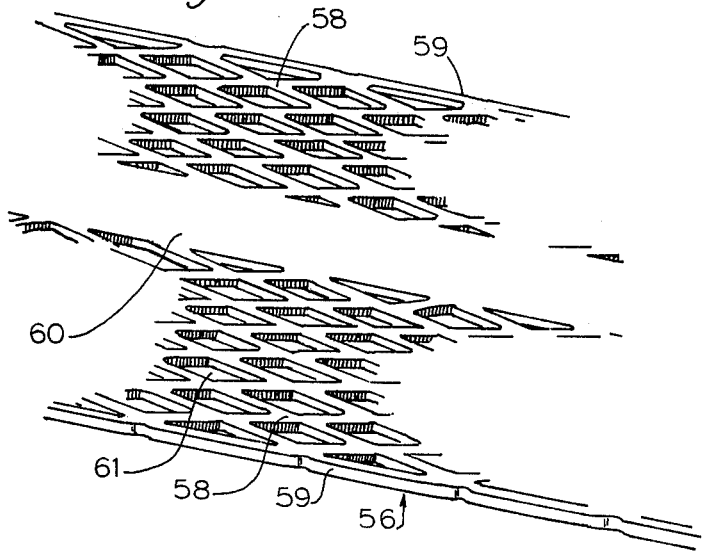
FIG. 11 shows a portion of the expanded lead strip after it has been flattened, smoothed and reduced in thickness.

Rollers 26, 28 and 30 cooperate to provide smoothing of expanded strip 28 during the flattening process so that as expanded strip 56 reaches rollers 32 and 34 to pass between them strip 56 is substantially free of any wrinkles with the result that after expanded strip passes between rollers 32 and 34 the product is a substantially flat wrinkle free lead strip as shown in FIG. 11.

The above detailed description is intended to be illustrative only. Out invention is subject to various modifications, changes and the like without departing from the scope and spirit of it. Consequently, the limits of our invention should be determined from the claims appended hereto. For example, while an expanded strip having two mesh portions divided by a longitudinally extending unexpanded portion has been described our invention is equally applicable to producing expanded strip having a single mesh portion and a longitudinally extending unexpanded portion. Further, the expanded strip produced by our invention is susceptible to applications other than the fabrication of plates for batteries.

What is claimed is:

1. A method of making expanded metal strip comprising:
   moving a metal strip through an expanding machine having a row of progressive dies and a cutter;
   operating the machine in synchronism with movement of the strip so that the strip is expanded into a non-planar shape with a mesh portion and a longitudinally extending unexpanded portion; and
   Flattening the expanded strip from its non-planar shape by moving the expanded strip past a diverter so that the unexpanded portion is forced to a level substantially even with the outer edge of the mesh portion located transversely therefrom while the outer edge of the mesh portion is maintained substantially straight and taut.

2. The method as set forth in claim 1 and including the step of reducing the thickness of the mesh portion while simultaneously lengthening the unexpanded portion sufficiently to compensate for the lengthening caused by reducing the thickness of the mesh portion so as to prevent the expanded strip from becoming wavy.

3. A method of making expanded lead strip for use in fabricating plates for lead-acid secondary batteries comprising:
   moving lead strip through an expanding machine having two rows of progressive dies and cutters;
   operating the machine in synchronism with movement of the strip so that the strip is expanded into a non-planar shape with two mesh portions divided by a central longitudinally extending unexpanded portion; and
   flattening the expanded strip from its non-planar shape by moving the expanded strip past a diverter so that the central portion is forced to a level substantially even with the outer edges of the expanded strip located transversely therefrom while the outer edges are maintained substantially straight and taut.

4. The method as set forth in claim 3 and including the step of reducing the thickness of the mesh portions while simultaneously lengthening the unexpanded portion sufficiently to compensate for the lengthening caused by reducing the thickness of the mesh portions so as to prevent the expanded strip from becoming wavy.

5. A method of making expanded lead strip for use in fabricating plates for lead-acid secondary batteries comprising:
   moving a lead strip through an expanding machine having two rows of progressive dies and cutters;
   operating the machine in synchronism with movement of the strip so that the strip is expanded into a non-planar shape with two mesh portions divided by a central longitudinally extending unexpanded portion;
   moving the expanded strip in its non-planar shape past a diverter to force the central portion to a level near the level of the outer edges of the expanded strip located transversely therefrom; and
   passing the expanded strip between a pair of rollers which cooperate with the expanding machine to maintain the outer edges of the expanded strip substantially straight and taut and which reduce the thickness of the mesh portions to a predetermined thickness and lengthen the central portion sufficiently to compensate for the lengthening caused by reducing the thickness of the mesh portions so as to prevent the expanded strip from becoming wavy.

6. A method of making expanded lead strip for use in fabricating plates for lead-acid secondary batteries comprising:
   moving a lead strip through an expanding machine having two rows of progressive dies and cutters;
   operating the machine in synchronism with movement of the strip so that the strip is expanded into a non-planar shape with two mesh portions divided by a central longitudinally extending unexpanded portion; and
   flattening the expanded strip from its non-planar shape by moving the expanded strip past a diverter so that the central portion is forced to a level past the outer edges of the expanded strip located transversely therefrom while passing the expanded strip between a pair of rollers which grip the expanded strip and pull it therethrough so that the outer edges of the expanded strip are maintained substantially straight and taut.

7. A method of making expanded lead strip for use in fabricating plates for lead-acid secondary batteries comprising:
   moving a lead strip through an expanding machine having two rows of progressive dies and cutters;
   operating the machine in synchronism with movement of the strip so that the strip is expanded into a non-planar shape with two mesh portions divided by a central longitudinally extending unexpanded portion;
   moving the expanded strip in its non-planar shape past a diverter to force the central potion to a level past the level of the outer edges of the expanded strip located transversely therefrom;
   moving the expanded strip around a first roller and between a first pair of rollers; and passing the expanded strip between a second pair of rollers which grip the expanded strip and pull it therethrough so that the outer edges of the expanded strip are maintained substantially straight and taut.

8. A method of making expanded lead strip for use in fabricating plates for lead-acid secondary batteries comprising:

moving a lead strip through an expanding machine having two rows of progressive dies and cutters;

operating the machine in synchronism with movement of the strip so that the strip is expanded into a non-planar shape with two mesh portions divided by a central longitudinally extending unexpanded portion;

moving the expanded strip in its non-planar shape past a diverter to force the central portion to a level past the level of the outer edges of the expanded strip located transversely therefrom while the outer edges of the strip are kept substantially straight and taut;

moving the expanded strip around a first roller and between a first pair of rollers; and passing the expanded strip between a second pair of rollers which reduce the thickness of the mesh portions to a predetermined thickness and lengthen the central portion sufficiently to compensate for the lengthening of the mesh portions caused by reducing the thickness of the mesh portions so as to prevent the expanded strip from becoming wavy.

9. Apparatus for producing flattened expanded strip from a solid strip comprising an expanding machine which produces expanded strip in a non-planar shape and having a mesh portion and a longitudinally extending unexpanded portion, means which diverts the unexpanded portion to substantially the same level as the outer edge of the mesh portion located transversely therefrom and means which grips the expanded strip and pulls it through said machine and past said diverting means, said gripping means cooperating with said expanding machine so that the outer edge of the mesh portion is maintained substantially straight and taut.

10. The apparatus as set forth in claim 9 wherein said gripping and pulling means is a pair of powered rollers.

11. Apparatus for producing flattened expanded strip froma solid strip comprising an expanding machine which produces expanded strip in a non-planar shape and having a pair of mesh portions divided by a central longitudinally extending unexpanded portion, means for diverting the central portion to a level past the level of the outer edges of the expanded strip located transversely therefrom, and means for gripping the expanded strip and pulling it through said machine and past said diverting means, said gripping means cooperating with said expanding machine so that the outer edges of the expanded strip are maintained substantially straight and taut between said machine and said gripping means.

12. Apparatus as set forth in claim 11 wherein said diverting means is a wheel mounted for rotation on a stationary support.

13. Apparatus as set forth in claim 11 wherein said gripping and pulling means is a pair of powered rollers.

14. Apparatus as set forth in claim 13 wherein one of said rollers has a central segment with a given diameter and two segments with a smaller diameter located on each side of said central segment.

15. Apparatus as set forth in claim 11 and including means for smoothing the expanded strip.

16. Apparatus as set forth in claim 15 wherein said smoothing means includes a single roller disposed to engage the expanded strip.

17. Apparatus for producing flattened expanded strip from a solid strip comprising an expanding machine which produces expanded strip in a non-planar shape and having a pair of mesh portions divided by a central longitudinally extending unexpanded portion, means for diverting the central portion to a level past the level of the outer edges of the expanded strip located transversely therefrom, and means for gripping the expanded strip, pulling it through the expanding machine and reducing the thicness of the mesh portions to a predetermined thickness while lengthening the central portion sufficiently to compensate for the lengthening of the mesh portions caused by reducing the thickness of the mesh portions so as to prevent the expanded strip from becoming wavy, said gripping means cooperating with said expanding machine so that the outer edges of the expanded strip are maintained substantially straight and taut between said machine and said gripping means.

18. Apparatus as set forth in claim 17 and including means for smoothing the expanded strip.

19. Apparatus as set forth in claim 18 wherein said diverting means includes a stationary support and a wheel mounted for rotation on said support, said gripping means includes a pair of powered rollers, one of said rollers having a central segment with a given diameter and two segments with a smaller diameter located on each side of said central segment, and said smoothing means includes a single roller located between said wheel and pair of rollers and disposed to engage the expanded strip.

* * * * *